United States Patent [19]
Söhoel

[11] Patent Number: 4,528,852
[45] Date of Patent: Jul. 16, 1985

[54] METHOD AND INSTRUMENT FOR DETERMINING THE CONDITION OF AN OPERATING BEARING

[75] Inventor: Eivind O. Söhoel, East Hampton, Conn.

[73] Assignee: SPM Instruments U.S. Inc., Marlborough, Conn.

[21] Appl. No.: 495,916

[22] Filed: May 20, 1983

Related U.S. Application Data

[63] Continuation-in-part of Ser. No. 435,679, Oct. 21, 1982, abandoned.

[51] Int. Cl.³ .......................................... G01M 13/04
[52] U.S. Cl. .................................. 73/593; 73/1 DV; 340/682
[58] Field of Search .................. 73/593, 9, 10, 1 DV; 340/682

[56] References Cited

U.S. PATENT DOCUMENTS 3,023,604 3/1962 Gordon et al. ............................ 73/9
3,554,012 1/1971 Sohoel ................................... 73/593
3,952,566 4/1976 Jacobson .............................. 73/593
4,253,326 3/1981 Munnich et al. ...................... 73/10
4,376,389 3/1983 Inoue et al. ........................... 73/118

OTHER PUBLICATIONS

L. D. Wedeven et al., "Optical Analysis of Ball Bearing Starvation", J. of Lubrication Tech., Jul. 1971, pp. 349-363.
R. S. Heemskerk et al., "Measurement of Lubrication Condition in Rolling Element Bearings", ASLE Trans., 25 (1982), pp. 519-527.

Primary Examiner—Stewart J. Levy
Assistant Examiner—John E. Chapman, Jr.
Attorney, Agent, or Firm—McCormick, Paulding & Huber

[57] ABSTRACT

A method and system for determining the lubricational condition of an operating rolling element bearing utilizing a shock pulse measuring technique. A schedule of occurring shock pulses and lubricant film parameters for a running rolling element control bearing is established. The magnitude of occurring shocks within the operating bearing is determined and the lubricational condition of the operating bearing determined with reference to the established schedule. A programed shock pulse measuring instrument provides direct output of information relative to the lubricational condition of an operating bearing.

15 Claims, 9 Drawing Figures

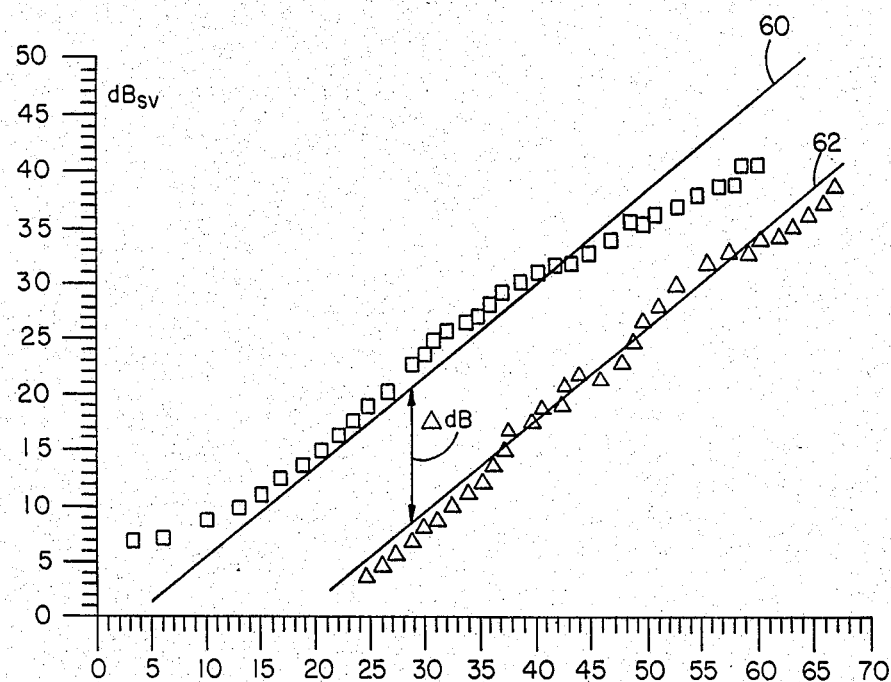
FIG. 5   $27 \times [\log(nDm) - 3.6]$
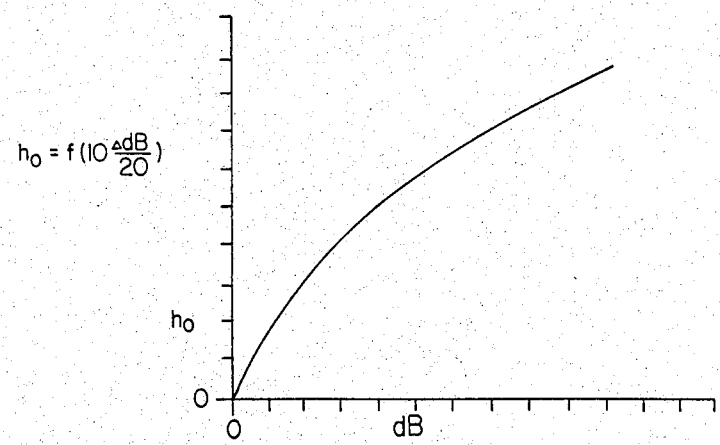
FIG. 6

METHOD AND INSTRUMENT FOR DETERMINING THE CONDITION OF AN OPERATING BEARING

This is a continuation-in-part of application Ser. No. 435,679, filed Oct. 21, 1982, and now abandoned.

This invention relates in general to testing and measuring instruments and methods and deals more particularly with an improved method and instrument or system for determining the operating condition of a bearing and more specifically the lubricational condition of an operating bearing of rolling element type.

When a ball or roller bearing is correctly mounted, adequately lubricated, and otherwise properly handled, the conditions which cause failure are substantially eliminated, with the exception of material fatigue. In a proper bearing installation, the effectiveness of the bearing lubricant is dependent upon its ability to adequately separate the rolling surfaces. The thickness of the thin, protective elastohydrodynamic lubricant film is often only slightly greater than the sum of the roughnesses of the lubricated bearing surfaces separated by it. Theoretical and analytical investigations have resulted in development of an elastohydrodynamic lubricant film parameter to rate effectiveness of lubrication in ball and roll bearing applications. The later parameter comprises a function of the lubricant film thickness and the roughness of the lubricated surfaces. Theoretical predictions which provide the basis for the elastohydrodynamic lubricant film parameter for both nominal line and point contacts in rolling element bearings have been experimentally confirmed utilizing such techniques as capacitance measurement coupled with knowledge of the dielectric constant of the lubricant to estimate film thickness. Other experimental investigations utilizing X-ray transmission techniques, transparent components, and interferometry have been used to study lubricant film thickness and shape. A qualitative indication of the effect of the lubricant film thickness on bearing endurance has also been obtained by measuring the time percentage in an operating bearing during which metal-to-metal contact is prevented by the presence of the lubricant film.

The value of the elastohydrodynamic lubricant film parameter $\Lambda$ generally falls within the range of 0.8 to 4 for most bearing applications. When the value of $\Lambda$ is less than 0.8 a risk of surface distress exists due to sporatic interruption of the lubricant film indicating that corrective measures may be required to improve lubrication. A value of $\Lambda$ greater than 4 indicates continuous separation of rolling surfaces by a full elastohydrodynamic lubricant film. When this condition exists, the "rating life" for the bearing may be expected to be at least twice the listed catalog rating for the particular bearing. However, under optimal operational conditions, where it is desired to minimize bearing play while maintaining adequate film separation for satisfactory bearing life, the value of $\Lambda$ will be somewhat less than 4. Such a condition may be desirable, for example, in a precision apparatus, such as a lead screw mechanism, machine spindle or the like.

The theoretical value of $\Lambda$ for both nominal line contact, in a roller bearing, or point contact in a ball bearing application may be calculated and such calculation is of great utility in the analysis and design of roller and ball bearing applications. The accuracy of design criteria may be confirmed by one of the experimental techniques hereinbefore generally described, however, while such experimental techniques are of value in checking the theoretically predicted lubricant film thickness, they do not afford practical means for evaluating the lubricational condition of a bearing under field operating conditions.

Many bearing installations operate under less than ideal conditions, normally assumed or provided in most theoretical and experimental investigations. An important practical consideration is the supply and distribution of lubricant in the vicinity of the rolling element contact region. Lubricant starvation which often exists, but is not always recognized, can have an overriding effect on lubricant film thickness and other elastohydrodynamic aspects of bearing operation.

It is well known in the bearing art that impacts between the raceways and rolling elements of a bearing cause shock pulses which travel through the bearing and the bearing housing. Relationships exist between the operating condition of a bearing and the magnitude of the shocks occurring within the operating bearing. Heretofore, a method and system has been provided for evaluating the general mechanical state of a rolling element bearing by converting mechanical vibrations and shocks occurring with the bearing into electrical oscillations which may be analyzed to obtain general information as to the operating condition of the bearing. Such a method and system is the subject of my earlier U.S. Pat. No. 3,554,012 for Method And Arrangement For Determining The Mechanical State Of Machines, issued Jan. 12, 1971.

It is the general aim of the present invention to provide an improved method and system for evaluating the operating condition of a rolling element type bearing within an operating mechanism and more particularly a method for determining a lubricant film parameter of the bearing. It is a further aim of the present invention to provide an improved method and system for providing a measurement of lubricant film thickness in a bearing of a rolling element type operating under field conditions, and, if desired, indicating whether a lubricant starvation condition exists in the bearing.

SUMMARY OF THE INVENTION

In accordance with the present invention, the lubricational condition of an operating bearing of rolling element type is determined by providing a control bearing which has physical characteristics substantially matching to the physical characteristics of the operating bearing, running the control bearing, determining the relative rolling velocity of the rolling elements of the running control bearing, determining the elastohydrodynamic lubricant film parameter of the running control bearing, determining the relative magnitude of occurring shocks within the running control bearing, establishing a schedule of occurring shocks and lubricant film parameters, determining the relative rolling velocity of the rolling elements of the operating bearing, determining the magnitude of the occurring shocks within the operating bearing, and determining the lubricational condition of the operating bearing from the established schedule. An improved shock pulse measuring instrument or system embodying the present invention is programmed to provide direct output signals indicative of a bearing lubrication film parameter. The instrument may be further arranged to provide other output signals which yield further information as to the lubricational condition of a bearing.

BRIEF DESCRIPTION OF THE DRAWINGS

FIG. 5 is a graphic illustration of a schedule developed in accordance with a method of the present invention.

FIG. 6 is a graphic illustration of another schedule developed in accordance with a method of the present invention.

DETAILED DESCRIPTION OF PREFERRED METHOD AND APPARATUS

Figure 2:
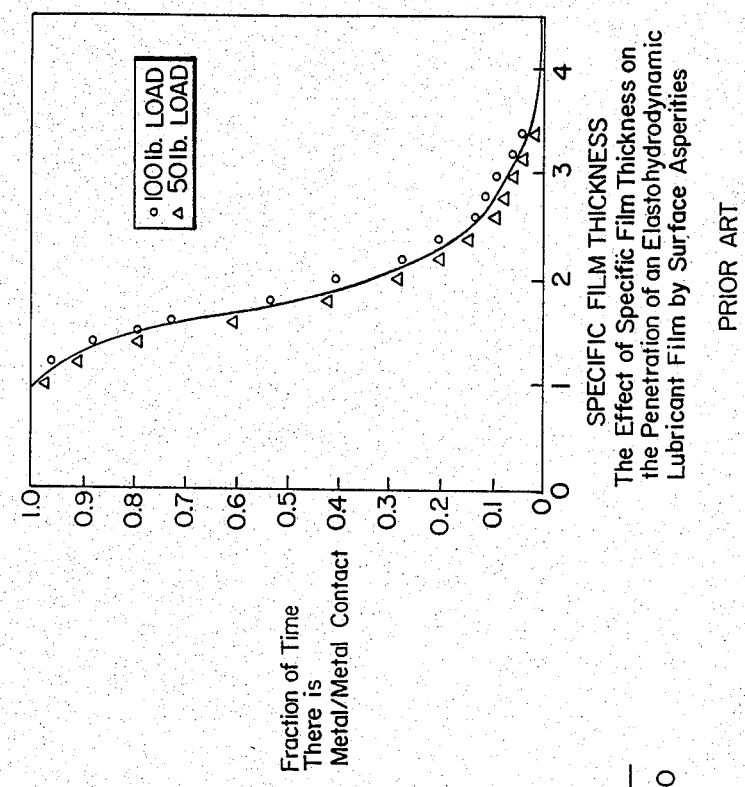
FIG. 2 is a graphic illustration of the effect of specific film thickness on the penetration of an elastohydrodynamic lubricant film by surface asperities (Prior Art).

Shock pulses which occur in a rotating ball or roller bearing result from impacts between the raceways and rolling elements of the bearing. These shock pulses travel from points of impact through the bearing and the bearing housing. Extensive experience has proven that relationships exist between the operating condition of a running bearing and the magnitude of shock pulses which occur within the bearing. These relationships provide a basis for the improved method and system hereinafter further described.

The method and system of the present invention utilize an indirect measure of impact velocity, i.e. the difference in velocity between two bodies at the moment of impact. At the point of impact or collision, a mechanical compression wave (a shock pulse of very transient rise time) occurs instantaneously in each colliding body and radiates outward through the body from the point of impact. In a bearing the transient rise time and magnitude of a shock pulse is essentially determined by the speed of sound through the bearing material and the mutual speed of rotation of the two colliding bodies involved.

The initial vibrations in a running bearing cause a multitude of different transients of relatively high frequency in the materials which comprise the component parts of the bearing. The amplitude, frequency and dampening cycle of these transients are determined by the properties of these materials and the design of the component parts. The determination of the mechanical state of a bearing is based upon measurement and analysis of the transient vibrations occurring within the bearing and is thereby strongly affected by the characteristics (transient response) of the particular bearing.

As taught in my aforementioned U.S. patent, mechanical vibrations and shocks which occur within an operating bearing may be converted to analogous electrical oscillations. The initial vibrations generate transient oscillations in the pickup used. The frequency and dampening process of these transients are determined by the characteristics of the pickup and thus represent known physical quantities. Analysis apparatus may be used to select, with the assistance of a highpass filter, a frequency range in which these transient vibrations appear. The vibrations in a selected frequency range are processed by means of a discriminator and a gate system, so that only those oscillations which exceed the level to which a selected portion (e.g. 95 percent) of the amplitudes reached during a selected time period are allowed to pass. Assuming the occurrence or distribution frequency of the transient oscillations is not too high, it is possible to isolate individual transient oscillations. The electrical analysis apparatus also determines the maximum amplitude, the mean amplitude or the amplitude distribution in the individual transient oscillations, or converts the energy content of the transient oscillations to an analogous pulse in which the amplitude is analogous to and varies proportionally with the energy content of the transient oscillations. Further, it is possible to statistically analyze the distribution of the transients to establish the occurrence frequency of the transients as a function of magnitude (maximum amplitude, mean amplitude or energy). It is also possible to measure the average occurrence frequency of the transients at a selected magnitude, the maximum magnitude of the transients within a selected time period, or to determine the mean or maximum magnitude of the transients at a determined time period within the operating cycle of a bearing. A system for performing the foredescribed functions is illustrated and described in my aforementioned U.S. Pat. No. 3,554,012, which is hereby adopted by reference as part of the present disclosure. An instrument embodying the aforesaid system is manufactured and marketed by SPM Instrument U.S., Inc., Marlborough, Conn.

In evaluating the lubricational condition of an operating rolling element bearing in accordance with the method of the present invention, utilizing the shock pulse measuring technique hereinbefore generally described, it is necessary to acquire information relating to a running control bearing having physical characteristics substantially matching the physical characteristics of the operating bearing to the evaluated. The control bearing, must, of course, be correctedly mounted, adequately lubricated, and otherwise properly handled so that all conditions normally responsible for bearing failure, with the exception of material fatigue, are substantially eliminated. The relative rolling velocity of the rolling elements of the control bearing is determined in accordance with the formula:

$$RPM \times Dm$$

wherein:
RPM is the rotational speed of the bearing expressed as revolutions per minute, for example;
and $$Dm = \frac{ID + OD}{2}$$

wherein:
Dm is the bearing mean diameter measured in milimeters, for example,
ID is the inside diameter of the bearing, and
OD is the outside diameter of the bearing.

The amplitude of occurring shocks within the running control bearing is monitored utilizing a shock pulse measuring instrument, as hereinafter further discussed. The elastohydrodynamic lubricant film parameter Λ of the running control bearing is also determined.

In order to properly evaluate the condition of a bearing utilizing the shock pulse measurement method, it is necessary to establish a standard of comparison, i.e., a norm value for identical or similar bearings. In every operating bearing a large number of minor shock pulses occur in very rapid sequence due to normal surface roughness which exists even in perfect bearings. Further, as the rotational speed of a bearing increases, the amplitude of the shock pulses which occur within the bearing also increase. Such norm values have been obtained empirically by measuring shock pulses in a large number of new, perfect ball and rolling bearings. From this known data the influence of normal surface roughness and rotational speed upon shock pulse measurements may be eliminated, so that the amplitude of the shock pulses considered in the evaluation of a bearing are normalized values or amplitudes above the norm for a bearing of known physical characteristics in good condition and operating at a known speed.

The shock pulse measuring instrument used in practicing the invention measures impact velocity over a large dynamic range. However, in order to simplify readout and evaluation a logarithmic measuring unit is used: decibel Shock Value ($dB_{sv}$).

Figure 1:
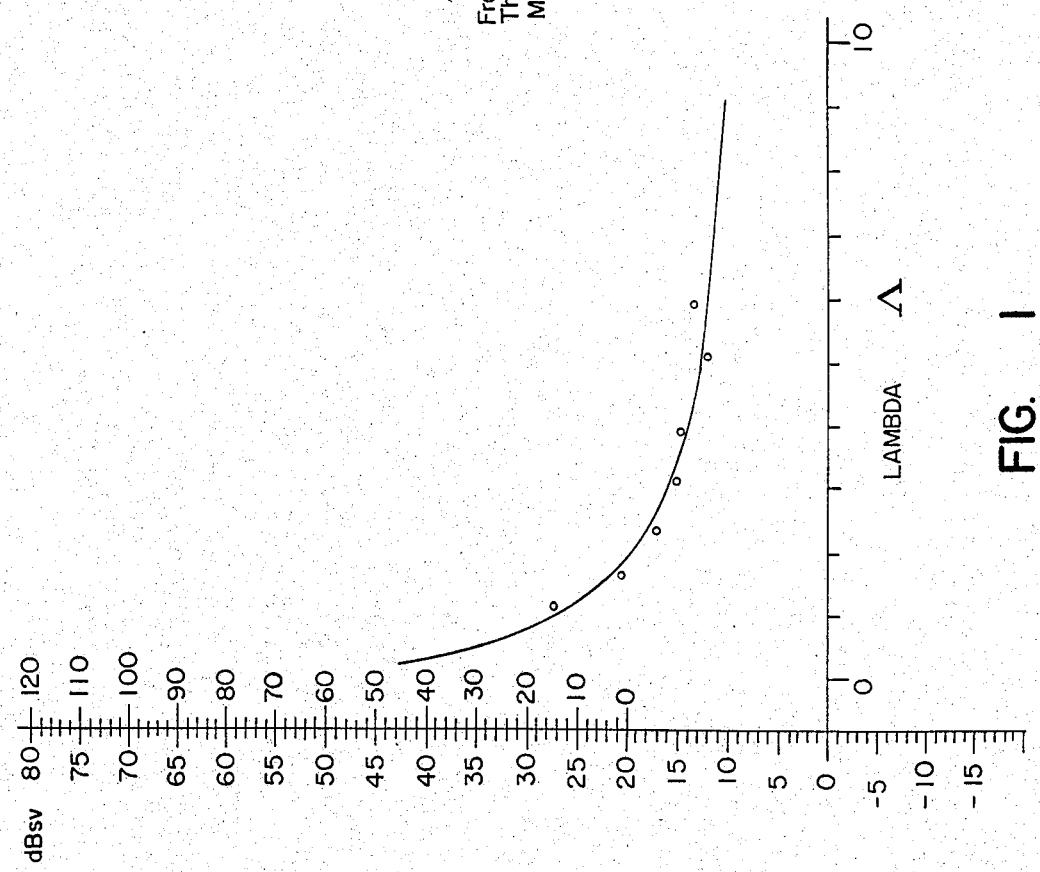
FIG. 1 is a graphic illustration of a schedule developed in accordance with a method of the present invention.

Referring now to FIG. 1, a typical schedule or graphic plot developed in accordance with a method of the present invention is illustrated. The intercepts of the normalized shock values ($dB_{sv}$), as determined at various rotational speeds of the test bearing, are plotted and statistically grouped relatively to corresponding elastohydrodynamic lubricant film parameters to produce the illustrated schedule. The resulting plot is a function of shock within the control bearing and oil film parameter.

After a schedule has been developed for a control bearing, as hereinbefore described, an operating bearing, having like physical characteristics, and which may comprise a part of a machine, may be evaluated by measuring the relative velocity of its rolling elements and the shock pulses which occur within it. The lubricational condition of the operating bearing may then be evaluated with reference to the established schedule.

Means for determining the elastohydrodynamic film parameter of a bearing are well known to those skilled in the bearing art, however, in accordance with the presently preferred method for practicing the invention the elastohydrodynamic lubricant film parameter of the running control bearing is calculated based upon measurements, made under controlled conditions.

More specifically, a predetermined load is first applied to the running control bearing. The temperature of the running control bearing is also measured. The characteristics of the lubricant are, of course, known. The elastohydrodynamic oil film parameter is determined in accordance with the formula:

$$\Lambda = H[\mu_o \alpha N]^{0.73 - 0.09 P_o}$$

wherein:
Λ is the elastohydrodynamic lubricant film parameter.
H is a value which pertains to the geometry and dimensions of the test bearing.
$\mu_o$ is the dynamic viscosity of the lubricant expressed as lb.-sec/in$^2$ measured at bearing operating temperature.
α is pressure coefficient of viscosity in 1/psi measured at operating temperature.
N is speed of rotation and
$P_0$ is the equivalent load calculated in accordance with the formula:

$$P_0 = X_0 F_r + Y_0 F_a$$

wherein:
$X_0$ is a radial factor;
$F_r$ is the actual constant radial load;
$Y_0$ is a thrust factor and $F_a$ is the actual constant thrust load.

The relationship between the time percentage during which metal-to-metal contact is prevented in a running bearing by the presence of a lubricant film and the elastohydrodynamic film parameter of the lubricant has been established by T E Tallian. This relationship, which is well known to those skilled in the bearing art, is illustrated by the Tallian curve (Prior Art) shown in FIG. 2, and may be utilized to verify the calculated value of Λ, as determined by the aforesaid formula and test measurements. In accordance with a method of the present invention, a measurement of the time percentage during which metal-to-metal contact is prevented in the running control bearing by the presence of the lubricant may be made substantially simultaneously with the other measurements used in calculating the value of Λ. Reference to the aforesaid relationship, as established by Tallian, may be had to provide a rough check of the calculated values for Λ at various running speeds of the control bearing.

It will now be apparent that a direct correlation may be established between the amplitude of shock pulses occurring within the running control bearing and the time percentage during which metal-to-metal contact is prevented in the bearing of the presence of the lubricant film. This relation may, in turn, be utilized to establish a schedule or occurring shocks corresponding to elastohydrodynamics film parameters, as hereinbefore generally discussed, for use in evaluating the condition of a bearing, and such procedure is contemplated as being within the scope of the present invention.

Further, and in accordance with the invention, an improved shock pulse measuring instrument is provided for directly measuring a lubricant film parameter of an operating bearing and providing a direct output of the latter parameter. The instrument may further include means for outputting signals indicating other operating conditions of the bearing and still further signals to indicate the condition of the system and when the system cannot provide a valid output signal to indicate a lubricational condition or other condition of the bearing.

Figure 3:
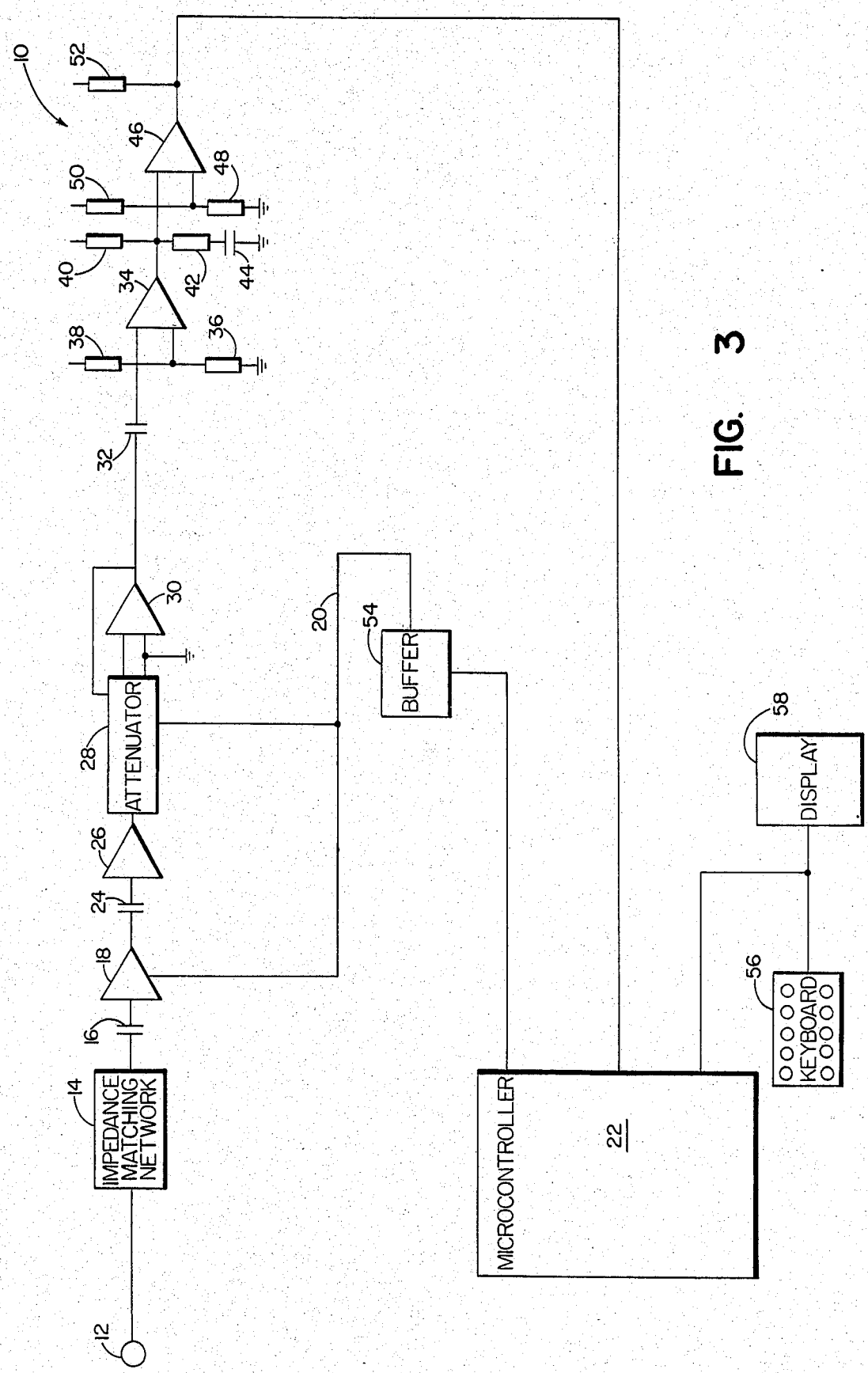
FIG. 3 is a block diagram of a system or instrument embodying the invention.

Referring now to FIG. 3 there is shown a block diagram illustrating an improved apparatus embodying the present invention, indicated generally by the reference numeral 10, and used in practicing the methods hereinbefore described. The illustrated apparatus 10 includes a pickup or transducer 12 for converting mechanical vibrations in a bearing to analogous electrical oscillations. The presently preferred transducer comprises a piezoelectric accelerometer which has a resonant frequency of 30-40 KHz. The output signal from the transducer 12 is fed to an impedance matching network 14 designed to match the impedance of the transducer at the resonant frequency of the transducer. The output from the network 14 is coupled by a capacitor 16 to an attenuation network 18 controlled by a latched digital logic line 20 connected to a microcontroller indicated generally at 22. The attenuation network is designed to utilize maximum transducer current to minimize any influence of input noise. The output signal from the attenuation network is coupled through a capacitor 24 to an amplifier 26. The output signal from the amplifier 26 is fed to a logarithmic digital controller attenuator 28, which is also controlled by the latched digital logic line 20. An operational amplifier 30 is used to detect the output of the attenuator 28. The transient pulses from the operational amplifier 30 are fed through a capacitor 32 to an input voltage level detector 34. The threshold level of the voltage detector 34 is determined by the resistor voltage divider network which comprises resistors 36 and 38. The input signals to the voltage detector 34 correspond to the transient signal detected by the transducer 12.

Output pulses from the voltage level detector 34 are integrated by a resistive capacitive network comprised of resistors 40 and 42 and capacitor 44. The purpose of the latter network is to provide a delay to bridge the gap between pulses corresponding to the same input transient. These integrated pulses are fed to a pulse level converter which includes a voltage comparator 46 and resistors 48, 50 and 52. The pulses generated by the pulse level converter are counted by the microcontroller 22.

No pulses will be present at the output of the voltage level converter 46 when the transient amplitude oscillations do not exceed the voltage level established by the voltage level detector 34. The microcontroller 22 attenuates the input signal containing the transients by controlling attenuation of the elements 18 and 28 via the latched digital logic line 20 and a buffer 54 to adjust the input signal level containing the transients to the threshold level of the voltage level converter 34, so that pulses produced by the pulse level converter are correlated only to transients exceeding said threshold level.

A keyboard decoder 56 is provided to enable manual input of data to the microcontroller 22, such as the type of bearing (roller or ball) to be evaluated and the relative rolling velocity of its rolling elements (RPM×Dm). The system 10 further includes a display 58 for providing visual indication of test results. Microcontroller 22 varies the amplification of the signal containing the transients while counting the number of pulses passing the threshold level until the occurrence frequency of the pulses corresponds to a first occurrence frequency $F_1$ and then to a second occurrence frequency $F_2$. The microcontroller 22 also accumulates and averages the data at each occurrence frequency to determine the average magnitude of the transients, calculates the difference between the two measurements $dB_{sv}F_2$ and $dB_{sv}F_1$ and normalizes the measurement $dB_{sv}F_1$ thereby eliminating the influence of the normal surface roughness of the bearing elements and bearing operational speed. The result of these calculations is compared to data stored within a memory section of the microcontroller 22.

Figure 4:
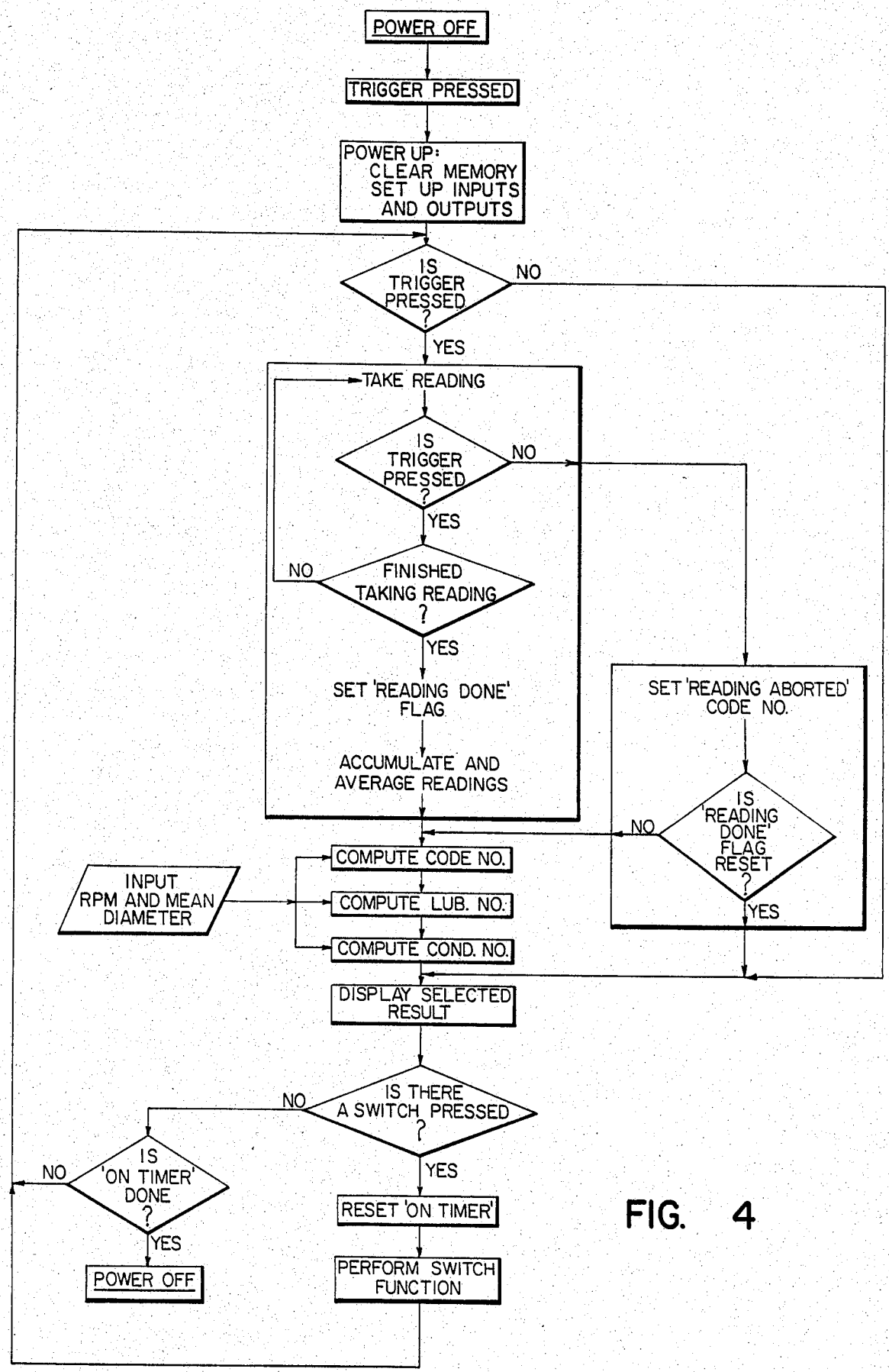
FIG. 4 is a flow diagram of the system of FIG. 3.

The flow diagram shown in FIG. 4 provides further information relating to the general operation of the system 10.

The dampening effect of an elastohydrodynamic lubricational film in a rolling element bearing is directly proportional to lubricational film thickness. As previously noted, the elastohydrodynamic lubricant film parameter comprises a function of lubricant film thickness and the roughness of the lubricated surfaces. This relationship is expressed in the following formula:

$$\Lambda = h_o/R_a$$

wherein:

$\Lambda$ is the elastohydrodynamic lubricant film parameter.

$h_o$ is the central film thickness and $R_a$ is the average surface roughness of the lubricated surfaces.

Further, and in accordance with the present invention, the relationship expressed in the foregoing formula is utilized in conjunction with a shock pulse measurement technique to provide a practical method for attaining a useful determination of absolute lubricant film thickness in a bearing operating under normal field conditions.

The average surface roughness of a bearing ($R_a$) will, of course, be determined by the manufacturing techniques used in finishing surfaces of the bearing elements. Such manufacturing techniques include microfinishing, grinding, machining and hot rolling and produce varying degrees of surface roughness. Ball bearings, and particularly those in precision applications, such as in aircraft, are usually microfinished. However, the benefits derived from microfinishing other types of bearings, such as industrial roller bearings, for example, are usually not considered great enough to justify the additional cost.

In order to compensate for differences in average surface roughness encountered in bearing of different types or in bearings of the same type, but made by different manufacturers, a control bearing is employed, which has physical characteristics substantially matching the physical characteristics of the operating bearing to be evaluated. The control bearing is run, first in an unlubricated condition, and then in a lubricated condition, to enable determination of the dampening effect of the elastohydrodynamic lubricant film upon shocks occurring with the control bearing.

The term "unlubricated", used in this specification and in the claims which follow, refers to a bearing which is run in a substantially dry condition or at least in the absence of effective lubrication. To reduce the risk of bearing seizure, it may be desirable to "lubricate" the control bearing with an ineffective lubricant, that is a lubricant which has an elastohydrodynamic lubricant film parameter ($\Lambda$) not greater than 0.6, such as kerosene, for example, which will function primarily as a coolant rather than as a lubricant.

Preferably, the control bearing is cleaned with a suitable solvent, before it is run, to substantially remove all traces of factory applied lubrication. If a low viscosity lubricant, such as kerosene, is used to prevent bearing seizure at higher operating speeds, a sufficient load may be applied to the control bearing to assure substantially constant metal-to-metal contact within the running bearing. A suitable arrangement for electrical contact measurement may be provided to monitor the control bearing to assure that such metal-to-metal contact is maintained at substantially all times while the control bearing is being run in its unlubricated state.

The relative rolling velocity of the rolling elements of the unlubricated running control bearing is determined.

The unlubricated running control bearing is also monitored with a shock pulse measuring instrument, as hereinbefore described, to determine the magnitude of occurring shock pulses occurring at various operational speeds.

The control bearing is then lubricated and the magnitude of occurring shock pulses within the lubricated control bearing is determined at various operating speeds, preferably corresponding to operating speeds at which shock pulse measurements were made in the unlubricated control bearing.

Referring to FIG. 5, the intercepts of the normalized shock values ($dB_{sv}$) for the control bearing, both in its unlubricated and lubricated conditions, as determined at various rotational speeds, are statistically grouped and plotted to produce the illustrated graphic schedule in which the plot designated by the numeral 60 represents the dry or unlubricated condition and the plot indicated by the numeral 62 indicates the lubricated condition of the control bearing.

The difference between the shock pulse measurements obtained for the unlubricated control bearing and the lubricated control bearing at any given operating speed ($dB_{sv}$) enables determination of the dampening effect upon shocks occurring within the bearing at that operating speed attributable to the addition of a sufficient elastohydrodynamic lubricant film. The elastohydrodynamic lubricant film parameter $\Lambda$ for the lubricated control bearing may be readily determined by one of the methods hereinbefore described.

When sufficient test data has been obtained by operating the control bearing under substantially unlubricated and lubricated conditions, the control bearing is disassembled and the average roughness of the race and bearing element contact surfaces ($R_a$) is determined by physical measurement, utilizing measuring techniques well known in the art. The absolute value of the oil film thickness ($h_o$) in the central region of contact may now be calculated using the formula:

$$h_o = \Lambda R_a$$

A schedule is now developed to indicate the absolute thickness of the oil film $h_o$ in the control bearing which is indicated by the difference in magnitude of shock pulse occurrence at a given operating speed ($dB_{sv}$ unlubricated $- dB_{sv}$ lubricated). The schedule of information so developed for any given operation 8 speed is illustrated by the graphic plot in FIG. 6. This information is then utilized to evaluate the condition of the operating bearing by determining the relative rolling velocity of the rolling elements in the operating bearing and the magnitude of occurring shock pulses within the operating bearing.

It will now be apparent that the schedule of data obtained by the foregoing method may be utilized in the shock pulse measuring instrument hereinbefore described. The required information is or may be stored within the memory of the instrument, preferably in the form of formulae or linear equations which relate to various bearing types and lubricants used therewith. The instrument is, of course, arranged to receive the required input data, as, for example, the specific identity of the bearing to be monitored and the type of lubricant used in the operating bearing and may be programmed to provide a directed readout of absolute lubricant film thickness $h_o$.

Experimental work performed by others has conclusively established that lubricant film thickness in a rolling element bearing is primarily developed in the inlet region just in advance of the flattened or Hertzian region of the rolling element. An article entitled, *Optical analysis of Ball Bearing Starvation*, by L. D. Wedeven, D. Evans and A. Cameron, Journal of Lubrication Technology, American Society of Mechanical Engineers, July, 1971, which is hereby adopted by reference as part of the present disclosure, contains an in-depth discussion of ball bearing lubricant starvation and experiments conducted to determine elastohydrodynamic oil film measurements for rolling point contact under starvation conditions utilizing optical interferometry. This experimental work resulted in the development of a semi-empirical formula for determining lubricant thickness in a rolling element bearing and which includes consideration of the effects of lubricant starvation. This formula is used in conjunction with the shock pulse measuring techniques and methods hereinbefore described to provide a practical means for determining occurrence of a lubricant starvation condition in a bearing operating under normal field conditions.

Figure 7:
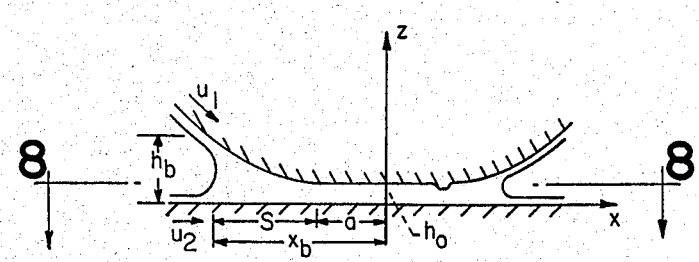
FIG. 7 is a somewhat schematic fragmentary cross-sectional view through the rolling element of a bearing illustrating the contact geometry of a typical rolling element and showing required measurements for a determination of lubricant starvation.
Figure 8:
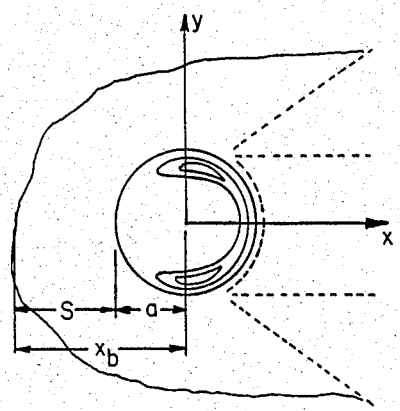
FIG. 8 is a schematic sectional view taken generally along the line 8—8 of FIG. 7.

FIGS. 7 and 8 illustrate the contact geometry of a rolling element or ball and show measurements required for determination of lubricant film thickness in a rolling element bearing using the following formula developed by Wedeven, Evans and Cameron, as set forth in the aforementioned publication.

$$\frac{h_o}{R} = 1.73 \left[ \frac{s}{s_f} \left( 2 - \frac{s}{s_f} \right) \right]^{1/2} \left( \frac{\alpha \mu_o u}{R} \right)^{5/7} \left( \frac{w}{E'R^2} \right)^{-1/21}$$

wherein:

$h_o$ = central film thickness.
R = reduced radius of contact.
$R_1$; $R_2$ = radius of contacting bodies
S = inlet distance, $S = (x_b - a)$
  $x_b$ = distance from the inlet lubricant boundry to the center of the Hertzian region.
  a = Hertzian radius
$S_f$ = inlet distance to obtain a flooded condition
$\alpha$ = pressure viscosity coefficient
$\mu_o$ = dynamic viscosity of the lubricant in lb.-sec/in measured at bearing operating temperature
u = combined surface velocity = $\frac{1}{2}(u_1 + u_2)$
  $u_1$, $u_2$ = velocity of the bearing surfaces
$P_o$ = load
$E'$ = reduced elastic modulus $$\frac{1}{E'} = \frac{1}{2} \left[ \frac{1 - a^2}{E_1} + \frac{1 - a^2}{E_2} \right]$$

$E_1$, $E_2$ = modulus of elasticity of bearing materials.

In the foregoing formula if a flooded condition is assumed $S = S_f$ and $$\left[ \frac{s}{s_f} \left( 2 - \frac{s}{s_f} \right) \right] = 1$$

and a constant load $P_o$ is maintained $$\left(\frac{P_o}{E^1 R^2}\right)^{-1/21}$$

becomes negligable

The resulting equation $$h_o = 1.73\, (\alpha\mu_o u)^{5/7}$$

may be solved to obtain values of $h_o$, elastohydrodynamic lubricant film thickness, for flooded lubricant conditions in a bearing having known physical characteristics, lubricated with a known lubricant and operating at various rotational speeds.

Figure 9:
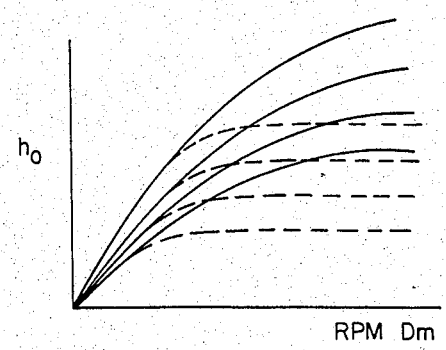
FIG. 9 is a graphic plot illustrating another schedule developed in accordance with a method of the present invention.

Values of $h_o$ obtained in accordance with the latter method are used to develop a schedule or graphic plot, illustrated in FIG. 9, wherein values of central film thickness ($h_o$) for the same bearing lubricated with lubricants of different viscosities are plotted against linear velocities of the rolling elements. The flattened portions of the plots, shown in broken lines, represent typical lubricant starvation conditions.

The lubricant film thickness for the operating bearing, as determined by the method previously discussed, is compared with the expected film thickness for a bearing of like kind lubricated with the same lubricant or a lubricant of substantially identical viscosity and operating in a flooded condition as indicated by the schedule illustrated in FIG. 10. If the value of $h_o$ for the operating bearing is below the expected value for a flooded bearing of like kind as indicated by the schedule (FIG. 10) a starved condition is indicated.

Data relating to expected film thickness for bearing of various types operating under various lubricational conditions may be stored within the memory section of the shock pulse measuring instrument shown in FIG. 3. The keyboard is used to program the instrument to make the necessary $h_o$ comparison and provide a direct indication of a lubricant starvation condition, and, if desired, indication of the degree of starvation.

By determining the average roughness of the contact surface of the control bearing, the value for the lubricant film thickness can be used to determine the elastohydrodynamic lubricant film parameter of the operating bearing in accordance with the formula:

$$\Lambda = h_o/R_a$$

wherein:

$\Lambda$ is the elastohydrodynamic lubricant film parameter;

$h_o$ is the central film thickness and $R_a$ is the average surface roughness of the contact surfaces.

I claim:

1. A method for determining the lubricational condition of an operating rolling element bearing comprising the steps of providing a lubricated control bearing having physical characteristics substantially matching the physical characteristics of the operating bearing, running the control bearing, determining the relative rolling velocity of the rolling elements of the running control bearing, determining the elastohydrodynamic lubricant film parameter of the running control bearing, determining the magnitude of occurring shock pulses within the running control bearing, establishing a schedule of occurring shocks and elastohydrodynamic lubricant film parameters, determining the relative rolling velocity of the rolling elements of the operating bearing, determining the magnitude of occurring shock pulses within the operating bearing, and determining the elastohydrodynamic lubricant film parameter of the operating bearing from said established schedule.

2. A method for determining the lubricational condition of an operating rolling element bearing comprising the steps of providing a control bearing having physical characteristics substantially matching the physical characteristics of the operating bearing, running the cntrol bearing in a lubricated condition, determining the relative rolling velocity of the rolling elements of the lubricated running control bearing, determining the elastrohydrodynamic lubricant film parameter of the lubricated running control bearing, determining the magnitude of occurring shock pulses within the lubricated running control bearing, running the control bearing in an unlubricated condition, determining the relative rolling velocity of the rolling elements in the unlubricated running control bearing, determining the magnitude of occurring shock pulses within the unlubricated running control bearing, establishing a schedule of differences in magnitude of occuring shock pulses within the lubricated and unlubricated running control bearing and elastohydrodynamic lubricant film parameters of the lubricated running control bearing corresponding to various relative rolling velocities of the rolling elements of the control bearing, determining the relative rolling velocity of the rolling elements in the operating bearing, determining the magnitude of occurring shock pulses within the operating bearing, and determining the elastohydrodynamic lubricant film parameter of the operating bearing from the established schedule.

3. A method for determining the lubricational condition of an operating rolling element bearing comprising the steps of providing a control bearing having physical characteristics substantially matching the physical characteristics of the operating bearing, running the control bearing in a lubricated condition, determining the relative rolling velocity of the rolling elements of the lubricated running control bearing, determining the central elastohydrodynamic lubricant film thickness of the lubricated running control bearing, determining the magnitude of occurring shock pulses within the lubricated running control bearing, running the control bearing in an unlubricated condition determining the relative rolling velocity of the rolling elements in the unlubricated running control bearing, determining the magnitude of occurring shock pulses within the unlubricated running control bearing, establishing a schedule of differences in magnitude of occurring shock pulses within the lubricated and unlubricated running control bearing and central elastohydrodynamic lubricant film thickness of the lubricated running control bearing corresponding to various relative rolling velocities of the rolling elements of the control bearing, determining the relative rolling velocity of the rolling elements in the operating bearing, determining the magnitude of occurring shock pulses within the operating bearing, and determining the central elastohydrodynamic lubricant film thickness of the operating bearing from the established schedule.

4. A method for determining the lubricational condition of an operating rolling element bearing as set forth in claim 3 wherein the control bearing is run in a flooded lubricant condition and the central elastohydrodynamic lubricant film thickness for the lubricated running control bearing is determined in accordance with the formula:

$$h_o = \left[ 1.73 \left( \frac{a\mu_o u}{R} \right)^{5/7} \left( \frac{P_o}{E^1 R^2} \right)^{-1/21} \right] R$$

wherein
 $h_o$ = the central film thickness
 $\alpha$ = the pressure viscosity coefficient of the lubricant
 $\mu_o$ = the dynamic viscosity of the lubricant expressed as lb-sec/in² measured at bearing operating temperature
and
 u = the combined surface velocity of the bearing contact surfaces;
 $P_o$ = load
 R = reduced radius of contact
 $R_1$; $R_2$ = radius of the contacting bodies and
 E' = reduced elastic modulus
 $E_1$; $E_2$ = modulus of elasticity of bearing materials, and
 a = Hertzian radius.

5. A method for determining the lubricational condition of an operating rolling element bearing as set forth in claim 4 including the additional step of determining the average roughness of the contact surface of the control bearing, and determining the elastohydrodynamic lubricant film parameter of the operating bearing in accordance with the formula:

$$\Lambda = h_o / R_a$$

wherein:
 $\Lambda$ is the elastohydrodynamic lubricant film parameter
 $h_o$ is the central film thickness and
 $R_a$ is the average surface roughness of the contact surfaces.

6. A method for determining the condition of an operating rolling element bearing as set forth in any one of claims 1–4 wherein the step of determining the elastohydrodynamic lubricant film parameter of the running control bearing is further characterized as determining the percentage of time during which metal-to-metal contact is prevented in the running control bearing by the presence of a lubricant film and determining the elastrohydrodynamic lubricant film parameter from the known relationship between the percentage of time during which metal-to-metal contact is prevented by the presence of a lubricant film and the elastrohydrodynamic lubricant film parameter.

7. A method for determining the lubricational condition of an operating rolling element bearing as set forth in claim 1 or 2 wherein the step of determining the elastohydrodynamic film parameter of the running control bearing is further characterized as applying a predetermined load to the running control bearing, measuring the temperature of the running control bearing, and determining the elastohydrodynamic oil film parameter in accordance with the formula:

$$\Lambda = H[\mu_o \alpha N]^{0.73} P_o^{-0.09}$$

wherein:
 $\Lambda$ is the elastohydrodynamic lubricant film parameter.
 H is a value which pertains to the geometry and dimensions of the test bearing.
 $\mu_o$ is the dynamic viscosity of the lubricant expressed as lb. sec/in² measured at bearing operating temperature.
 $\alpha$ is pressure coefficient of viscosity in 1/psi measured at bearing operating temperature.
 N is speed of rotation and
 $P_o$ is the equivalent load calculated in accordance with the formula:

$$P_o = X_o F_r + Y_o F_a$$

wherein:
 $X_o$ is a radial factor
 $F_r$ is the actual constant radial load
 $Y_o$ is a thrust factor, and
 $F_a$ is the actual constant thrust load.

8. A method for determining the lubricational condition of an operating rolling element bearing as set forth in any one of claims 1 through 4 wherein the steps of determining the magnitude of occurring shock pulses is further characterized as converting bearing vibrations into oscillatory electrical signals through a transducer having a resonant frequency higher than the vibration frequencies normally occurring in the bearing, converting shocks occurring within the bearing into oscillatory transient signals at a resonant frequency of the transducer, passing only those signals having a frequency equal to a resonant frequency of the transducer through a high pass filter connected to the transducer, and analyzing the signals passed by the filter.

9. A method for determining the lubricational condition of a operating rolling element bearing as set forth in any one of claims 1–4 wherein the steps of determining the magnitude of occurring shock pulses is further characterized as converting bearing vibrations into oscillatory electric transient signals, discriminating between the oscillatory electric signals and the transient signals, and analyzing said transient signals.

10. A method for determining the lubricational condition of an operating rolling element bearing as set forth in any one of claims 2–4 wherein the step of running the control bearing in a substantially unlubricated condition is further characterized as lubricating the control bearing with a lubricant which provides an elastohydrodynamic lubricant film parameter not greater than 0.6.

11. A method for determining the lubricational condition of an operating rolling element bearing as set forth in claim 10 including the additional step of aplying a load to the control bearing to maintain at least one of the rolling elements in the control bearing in metal-to-metal contact with its supporting race at substantially all times while the control bearing is running.

12. A method for determining the lubricational condition of an operating rolling element bearing as set forth in claim 11 including the additional step of electrically monitoring the control bearing to ascertain that the one rolling element is in metal-to-metal contact at substantially all times while the control bearing is running.

13. A system for determining and indicating the lubricational condition of an operating bearing comprising transducer means for converting vibrations within the operating bearing into oscillatory electrical signals and shocks occurring within the operating bearing into oscillatory electric transient signals, means for discriminating between said oscillatory electric signals and said transient signals, means for analyzing said transient signals and providing information output, memory means for containing a schedule of occurring shocks and corresponding elastohydrodynamic lubricant film parameter information, means for comparing said information output from said analyzing means with said information contained within said memory means, and signal means for providing an output signal indicative of the elastohydrodynamic lubricant film parameter of the lubricant in said operating bearing when said information output from said analyzing means corresponds to information contained in said memory means.

14. A system for determining and indicating the lubricational condition of an operating bearing comprising transducer means for converting vibrations within the operating bearing into oscillatory electrical signals and shocks occurring within the operating bearing into oscillatory electric transient signals, means for discriminating between said oscillatory electric signals and said transient signals, means for analyzing said transient signals and providing information output, memory means for containing a schedule of occurring shocks and corresponding central elastohydrodynamic lubricant film thickness information, means for comparing said information output from said analyzing means with said information contained within said memory means, and signal means for providing an output signal indicative of the central elastohydrodynamic lubricant film thickness of the lubricant in said operating bearing when said information output from said analyzing means corresponds to information contained in said memory means.

15. A system for determining and indicating condition of an operating bearing as set forth in either claim 13 or claim 14 wherein said means for analyzing is further characterized as means for statistically analyzing said transient signals.

* * * * *